J. J. AHEARN.
AUTOMOBILE RAILWAY TRACK.
APPLICATION FILED AUG. 7, 1917.
1,293,658.
Patented Feb. 11, 1919.
2 SHEETS—SHEET 1.
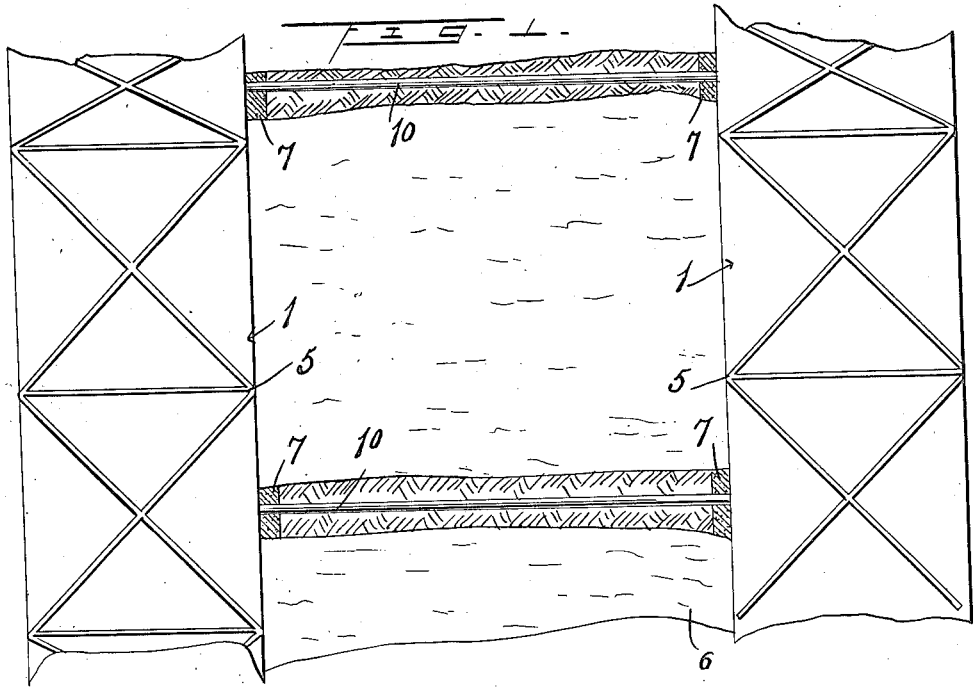
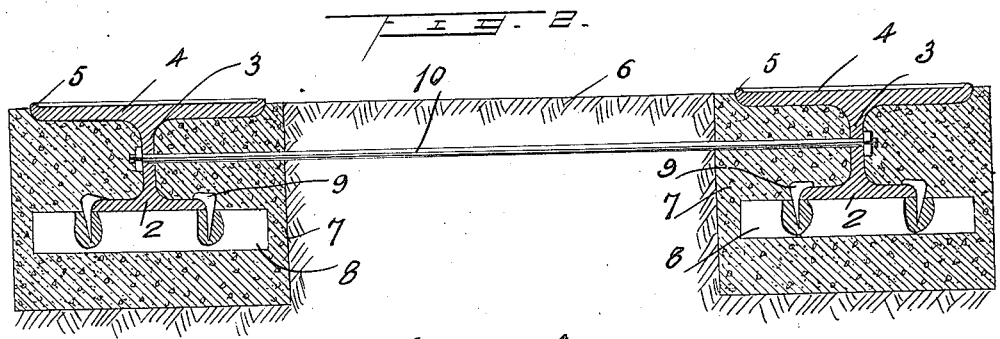
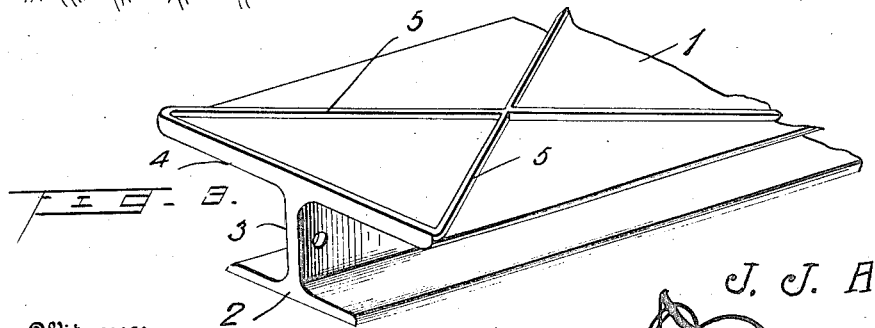
Inventor
J. J. Ahearn.
Witnesses

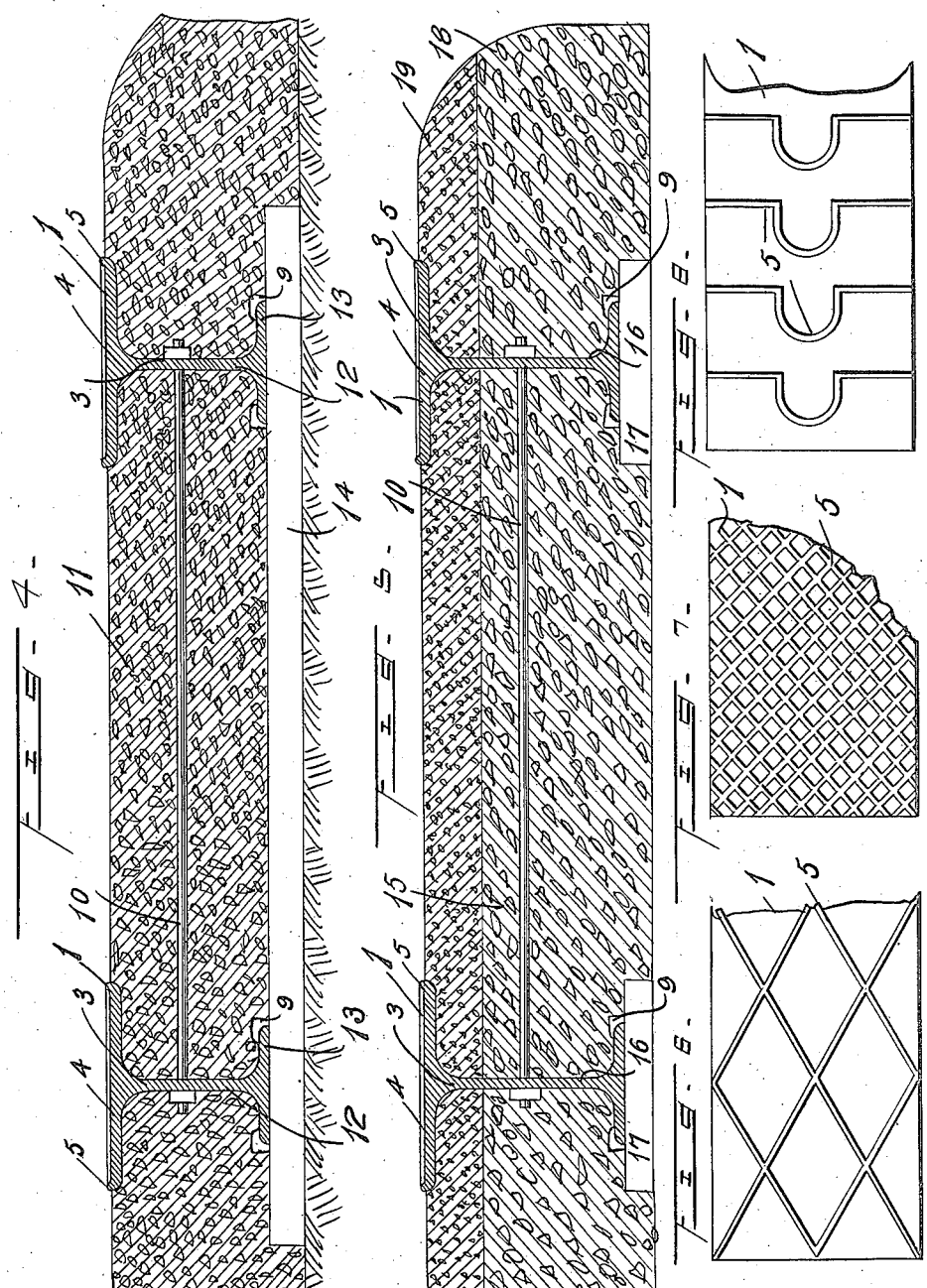

UNITED STATES PATENT OFFICE.

JOHN J. AHEARN, OF PALMER, NEW YORK.

AUTOMOBILE RAILWAY-TRACK.

1,293,658.  Specification of Letters Patent.  Patented Feb. 11, 1919.

Application filed August 7, 1917. Serial No. 184,894.

*To all whom it may concern:*

Be it known that I, JOHN J. AHEARN, a citizen of the United States, residing at Palmer, in the county of Saratoga and State of New York, have invented certain new and useful Improvements in Automobile Railway-Tracks; and I do hereby declare the following to be a full, clear, and exact description of the invention, such as will enable others skilled in the art to which it appertains to make and use the same.

This invention relates to improvements in an automobile railway track and has for one of its objects, the provision of a device of this character, which can be readily laid on or built into a roadway for the purpose of providing a track for an automobile or vehicle to travel upon.

Another object of this invention is the provision of rails supported by ties, which are embedded in or laid upon a road bed for the purpose of forming a track or runway for vehicles or automobiles to travel upon.

A further object of this invention is the provision of a supporting plate having formed thereon, a web on which is formed, a tread plate adapted to be disposed in a plane of the surface of a roadway so that a track or runway is provided for vehicles or automobiles to travel upon.

A still further object of this invention is the provision of an automobile railway track of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a fragmentary plan view partly in section of an automobile railway track constructed in accordance with my invention, Fig. 2 is a transverse sectional view of the same, Fig. 3 is a fragmentary perspective view of one of the rails, illustrating raised portions upon the tread face thereof, Fig. 4 is a transverse sectional view illustrating my invention applied to a gravel or stone road bed, Fig. 5 is a transverse sectional view illustrating my invention applied to a macadam road bed, Fig. 6 is a fragmentary plan view of a modified form of tread face to the rail, Fig. 7 is another modified form of tread surface to the rail, Fig. 8 is a fragmentary plan view of another modified form of tread surface to the rail.

Referring in detail to the drawings, the numeral 1 indicates as an entirety, a track consisting of relatively spaced rails as clearly shown in Figs. 1 and 2. The rails each consist of a supporting plate 2 on which is formed, a web 3. The web 3 has formed thereon, a tread plate 4, the upper face of which is provided with various designs of raised portions 5 as shown in Figs. 1, 6, 7 and 8 for the purpose of preventing a vehicle or automobile from skidding or slipping upon the tread face while traveling thereon.

In applying my preferred form of invention as shown in Figs. 1 and 2 to a road bed, the road bed 6 has dug therein, relatively spaced trenches, which are filled with cement 7. Short ties 8 are secured to the supporting plates 2 of the rails by spikes 9 and the ties and rails are then embedded within the cement 7 so that the tread plates are disposed in a plane with the surface of the road bed 6. Tying bars 10 are connected to the webs 3 of the rails and embedded within the road bed 6 as clearly shown in Fig. 2 to prevent the rails from spreading.

From the foregoing description taken in connection with the accompanying drawings, it will be noted that a track has been provided, which can be readily and conveniently embedded within the road bed of a road way so that a runway or track is provided for vehicles and automobiles to travel upon. The rails being constructed from metal so as to provide a track or runway that will last a considerable length of time.

In applying my invention to a gravel road bed 11, the webs 12 are of greater height than the webs 3 of my preferred form of invention, and the supporting plates 13 are mounted upon ties 14 that are substantially six feet in length. The ties are laid upon a hard surface and the rails placed thereon and connected together by the tying bars 10. The road way 11 is then built up about the webs and tread plates so that a runway or track is provided on which vehicles or automobiles may travel.

In applying my invention to a macadam road bed 15, the webs 16 are of a greater height than the webs 12 and are supported by ties 17 that may be of the short type as shown in my preferred form or of the six foot type as shown in Fig. 4. The webs are connected together by the usual tie bolts 10. The crushed stone 18 is filled in about the webs and supporting plates of the rails and the crushed stone and tar 19 placed thereon having the upper surface thereof disposed in a plane with the surface of the tread plates, providing a runway or track to a macadam road.

While I have shown and described the preferred embodiment of my invention, it will be understood that minor changes in construction, combination and arrangement of parts may be made without departing from the spirit and scope of the invention as claimed.

What is claimed is:

1. A roadway having a pair of spaced parallel longitudinally extending troughs therein, rails disposed within said troughs and adapted for vehicular traffic, said rails including supporting plates, webs and tread plates; transversely extending ties disposed beneath the supporting plates and secured thereto, said ties being of a lesser width than the troughs; a filling of cement adapted to be placed within the troughs to retain the rails securely in position; and transversely extending rods connecting the rails.

2. A roadway having a pair of spaced parallel longitudinally extending troughs therein; rails disposed within said troughs and adapted for vehicular traffic, said rails including supporting plates, webs and tread plates; transversely extending ties disposed beneath the supporting plates; and means connecting said transversely extending ties and said rails, said ties being of a lesser width than the troughs; and a filling of cement adapted to be placed within the troughs to retain the rails securely in position.

In testimony whereof I affix my signature in presence of two witnesses.

JOHN J. AHEARN.

Witnesses:
GEORGE D. BREEN,
Mrs. JOHN J. AHEARN.